(12) United States Patent
Preisser

(10) Patent No.: US 9,914,248 B2
(45) Date of Patent: Mar. 13, 2018

(54) METHOD FOR PRODUCING A HYBRID COMPOSITE COMPONENT FROM ORGANO SHEETS AND A METALLIC REINFORCING ELEMENT

(71) Applicant: Magna Seating (Germany) GmbH, Sailauf (DE)

(72) Inventor: David Preisser, Fuerth (DE)

(73) Assignee: MAGNA Seating (Germany) GmbH, Sailauf (DE)

( * ) Notice: Subject to any disclaimer, the term of this patent is extended or adjusted under 35 U.S.C. 154(b) by 324 days.

(21) Appl. No.: 14/886,012

(22) Filed: Oct. 17, 2015

(65) Prior Publication Data

US 2016/0107348 A1 Apr. 21, 2016

(30) Foreign Application Priority Data

Oct. 17, 2014 (DE) .................. 10 2014 221 165

(51) Int. Cl.

| B29C 51/12 | (2006.01) |
|---|---|
| B29C 45/14 | (2006.01) |
| B29C 45/16 | (2006.01) |
| B29C 45/00 | (2006.01) |
| B29C 45/72 | (2006.01) |
| B29K 705/00 | (2006.01) |
| B29K 23/00 | (2006.01) |

(Continued)

(52) U.S. Cl.
CPC .... *B29C 45/14508* (2013.01); *B29C 45/0001* (2013.01); *B29C 45/0046* (2013.01); *B29C 45/14008* (2013.01); *B29C 45/14631* (2013.01); *B29C 45/1657* (2013.01); *B29C 45/1671* (2013.01); *B29C 45/72* (2013.01); *B29C 45/14786* (2013.01); *B29C 2045/14532* (2013.01); *B29C 2045/1668* (2013.01); *B29K 2023/0633* (2013.01); *B29K 2105/12* (2013.01); *B29K 2105/256* (2013.01); *B29K 2305/00* (2013.01); *B29K 2309/08* (2013.01); *B29K 2623/12* (2013.01); *B29K 2677/00* (2013.01); *B29K 2705/00* (2013.01); *B29K 2713/02* (2013.01)

(58) Field of Classification Search
CPC ........ B29C 45/14508; B29C 45/14467; B29C 45/1642; B29C 45/1657; B29C 70/865; B29C 70/685
USPC .................................................. 264/257, 258
See application file for complete search history.

(56) References Cited

U.S. PATENT DOCUMENTS

| 4,571,135 A * | 2/1986 | Martin .................. B29C 70/685 411/427 |
|---|---|---|
| 2016/0136870 A1 * | 5/2016 | Thienel .................. B29C 51/12 428/213 |

(Continued)

FOREIGN PATENT DOCUMENTS

| DE | 10029411 A1 | 12/2001 |
|---|---|---|
| DE | 102009016177 A1 | 10/2010 |

(Continued)

*Primary Examiner* — Galen H Hauth
(74) *Attorney, Agent, or Firm* — Jordan IP Law, LLC; Todd A. Vaughn

(57) ABSTRACT

A method for producing a hybrid composite component from organo sheets and a metallic reinforcing element in such a way that the method may be inexpensively and simply performed and the hybrid composite component has the lowest possible weight and may absorb relatively high forces.

16 Claims, 3 Drawing Sheets

(51) Int. Cl.
    *B29K 105/12*     (2006.01)
    *B29K 105/00*     (2006.01)
    *B29K 305/00*     (2006.01)
    *B29K 309/08*     (2006.01)
    *B29K 677/00*     (2006.01)

(56) References Cited

U.S. PATENT DOCUMENTS

2016/0200014 A1\*   7/2016   Patberg .................. B29C 70/46
                                                                                     264/442
2016/0271901 A1\*   9/2016   Demange ................ B32B 15/14

FOREIGN PATENT DOCUMENTS

| DE | 102012218711 A1 | 4/2014 |
| DE | 102013213711 A1 | 1/2015 |
| DE | 102013013497 A1 | 2/2015 |

\* cited by examiner

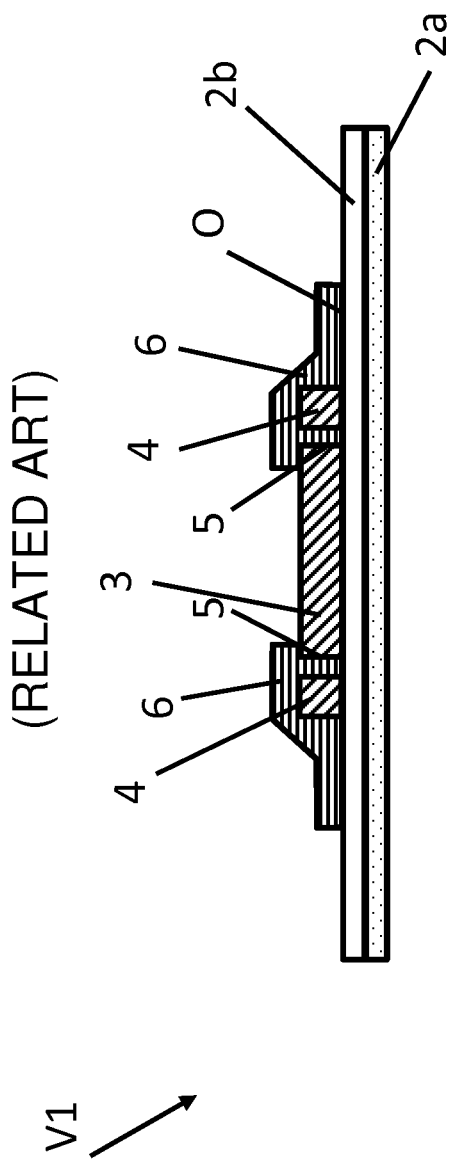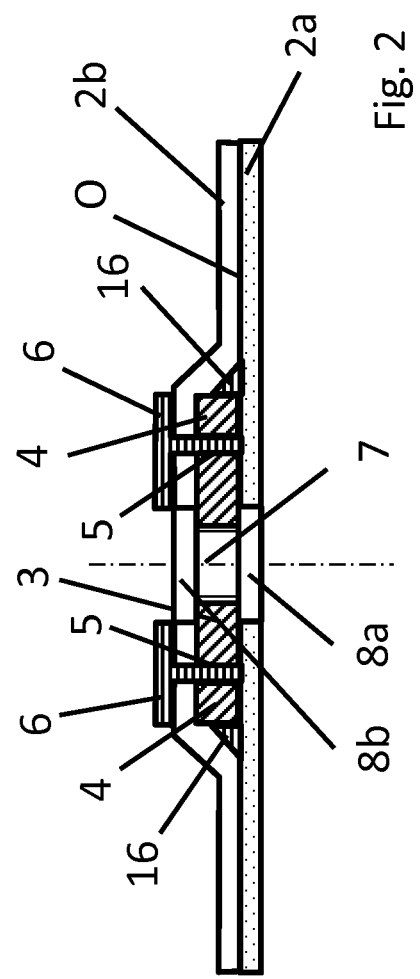

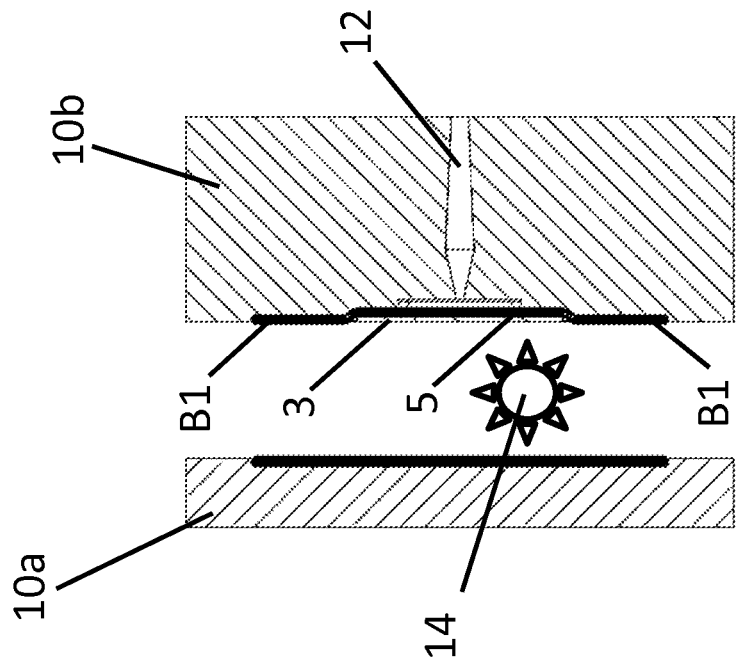
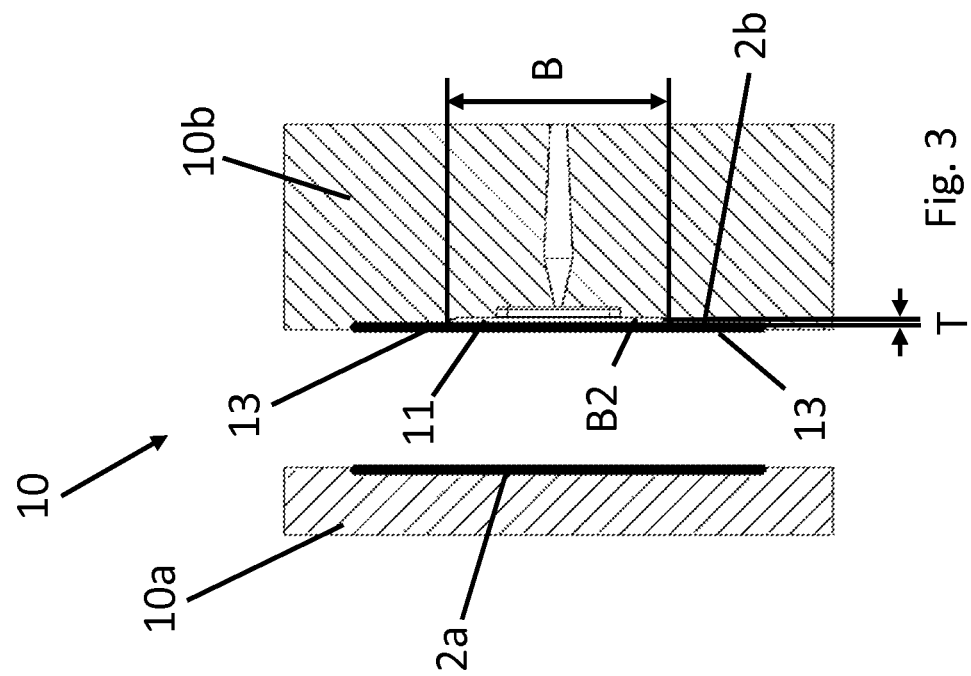

METHOD FOR PRODUCING A HYBRID COMPOSITE COMPONENT FROM ORGANO SHEETS AND A METALLIC REINFORCING ELEMENT

CROSS-REFERENCE TO RELATED APPLICATIONS

The present application claims priority 35 U.S.C. § 119 to German Patent Publication No. DE 102014221165.4 (filed on Oct. 19, 2014), which is hereby incorporated by reference in its entirety.

TECHNICAL FIELD

Embodiments relate to a method for producing a hybrid composite component from organo sheets and a metallic reinforcing element.

BACKGROUND

In motor vehicle interiors, a multitude of structural components of metal are known, as well as components made from injection-moulded materials. In order, on the one hand, to save weight and, on the other hand, nonetheless to achieve the necessary strength, "hybrid components" comprising a plastics body and interlockingly integrated metallic reinforcing elements are used as lightweight components.

Hybrid components of injection-moulded plastics materials are moreover also known in which blanks of "organo sheet" are embedded as reinforcements at heavily stressed locations. Organo sheet here denotes a textile fabric enclosed in a thermoplastic. The fabric may in particular be a woven fabric, laid fabric or nonwoven fabric of natural, carbon, glass or mineral fibres. If a thermoplastic is used for the encapsulation of the organo sheet by injection moulding which is materially identical or similar to the matrix of the organo sheet, it is possible during injection moulding to achieve a bonded connection between the organo sheet and the surrounding plastics material. The use of hybrid components often results in a weight saving relative to a purely metal component.

A bonded connection is understood to mean a connection in which the connected components are held together by atomic or molecular forces. This results in a non-detachable connection, which can only be undone by destroying the connection.

Some components or functional elements in motor vehicle interiors have to be made at least partially from a metallic material due to where they are used, their function and the loads arising at the component, or a metallic reinforcement is needed. In the case of a component made from an organo sheet which must be reinforced by a metallic component or which must be joined to a metallic component, a reliable connection must be produced, which must in particular also absorb/transfer relatively high forces in the region of the join.

An example which may be mentioned of such a join/connection in the region of the motor vehicle seat is the back-rest adjuster, which is made from a metallic material due to the forces arising and to be absorbed or due to the construction of the adjuster and the resultant connection technology. The back-rest adjuster may then be joined to a frame of the seat structure consisting of an organo sheet. Such a hybrid connection is conventionally produced in that a metallic reinforcing element is placed onto an organo sheet and the connection is imparted by encapsulating said element in a thermoplastic.

A method is known from German Patent Publication No. DE 10 2012 218 711 A1 for producing a multilayer moulding of hybrid structure from at least one organo sheet and one metal sheet connected therewith in a load-resistant manner. In this case, the metal and organo sheets are inserted into a forming tool in a non-deformed and unconnected state and are formed therein in the heated state, wherein the metal and organo sheets are connected together over the surfaces thereof.

Furthermore, German Patent Publication No. DE 10 2009 016 177 A1 discloses a composite component for motor vehicle internal trim elements and a method for the production thereof. To produce the composite component, a decorative layer and a fibre-reinforced plastics plate are inserted into an injection mould. After the process of joining the decorative layer and the fibre-reinforced plastics plate to produce a semi-finished product-like two-layer part, in a subsequent step a plastics material is injected into a cavity between fibre-reinforced plastics plate and associated mould half to mould on a functional layer. In this case, partial melting of the organo sheet is brought about, as well as through-flow through the organo sheet in the region of through-holes.

German Patent Publication No. DE 10 2013 213 711 A1 discloses a method for producing a structural component for motor vehicles by hot forming of an organo sheet. To reinforce regions of the structural component produced from organo sheet, additional receiving points are provided in the organo sheet which are injection-moulded closed with thermoplastic material after hot forming of the organo sheet.

FIG. 1 illustrates a sectional representation of a prior art hybrid composite component V1 of organo sheets 2a, 2b and a metallic reinforcing element 3. Two plate-shaped first and second organo sheets 2a, 2b are arranged on top of one another, having been bonded together in a preceding method step.

A metallic reinforcing element 3 rests on a surface region O of the first organo sheet 2b. The metallic reinforcing element 3 comprises first and second end regions 4, into which through-holes 5 have been introduced. The end regions 4 resting on the surface region of the first organo sheet are encapsulated in a plastics material 6 by injection moulding. This results in a bonded connection between plastics material 6 and the connected organo sheets 2a, 2b, and an interlocking connection between metallic reinforcing element 3, the organo sheets 2a, 2b and the plastics material 6. The interlocking connection between end regions 4 of the metallic reinforcing element 3 and the plastics material 6 is additionally improved by through-holes 5 introduced into the end regions 4 of the metallic reinforcing element 3.

The through-holes 5 are filled with the plastics material during the method step of encapsulation by injection moulding. This results, in the region of the through-holes 5, in additional anchoring/a bonded connection between plastics material 6 and the connected organo sheets 2a, 2b at the surface region O of the first organo sheet 2b facing the through-holes.

SUMMARY

Embodiments relate to a method for producing a hybrid composite component from organo sheets and a metallic reinforcing element in such a way that the method may be inexpensively and simply performed and the hybrid composite component has the lowest possible weight and may absorb relatively high forces.

In accordance with embodiments, a method for producing a hybrid composite component from first and second organo sheets and a metallic reinforcing element, includes at least one of: providing first and second organo sheets and a metallic reinforcing element provided with a plurality of through-holes; inserting the first organo sheet into a first mould half of a mould, and inserting the second organo sheet into a second mould half of the mould, wherein the second mould half is the injection-side mould half, which comprises a first region and a second region comprising a recess, and wherein the second region comprises a recess which has a depth, a width, and a length, and wherein the depth, width and length are embodied in accordance with the external dimensions of the metallic reinforcing element; laying the metallic reinforcing element onto the first organo sheet; closing the mould with the application of a pressure, in order to achieve a bonded connection of the regions of the organo sheets which lie directly on one another; injecting a thermoplastic into a mould gap kept free between an organo sheet and associated mould half, wherein the plastics material brings about partial melting of the organo sheet in the surface region facing the mould gap as well as through-flow through the organo sheets in the region of the number of through-holes and filling of the number of through-holes in the metallic reinforcing element, wherein a bonded connection is brought about between the plastics material and the organo sheets and an interlocking connection is brought about between plastics material, the organo sheets and the metallic reinforcing element; and opening the mould and removing the hybrid composite component.

In accordance with embodiments, a method for producing a hybrid composite component, the method comprising: providing a first organo sheet, a second organo sheet, and a metallic reinforcing element having a plurality of through-holes; inserting the first organo sheet into a first mould half of a mould, and inserting the second organo sheet into a second mould half of the mould, wherein the second mould half is an injection-side mould half including a first region and a second region having a recess with a depth, a width, and a length corresponding to the external dimensions of the metallic reinforcing element; laying the metallic reinforcing element on the first organo sheet; closing the mould with application of a pressure, in order to achieve a bonded connection of regions of the organo sheets which lie directly on one another; establishing a bond connection between the organo sheets and the metallic reinforcing element by injecting a thermoplastic material into a mould gap kept free between a respective one of the organo sheets and a corresponding mould half, in order to partially melt the organo sheet in a surface region facing the mould gap, as well as flow through the organo sheets in a region of, and to fill the through-holes; and opening the mould and removing the hybrid composite component.

In accordance with embodiments, a method for producing a hybrid composite component, the method comprising: providing a first organo sheet, a second organo sheet, and a metallic reinforcing element having a plurality of through-holes; inserting the first organo sheet into a first mould half of a mould, and inserting the second organo sheet into a second mould half of the mould, wherein the second mould half is an injection-side mould half including a first region and a second region having a recess with a depth, a width, and a length corresponding to the external dimensions of the metallic reinforcing element; laying the metallic reinforcing element on the first organo sheet; closing the mould with application of a pressure, in order to achieve a bonded connection of regions of the organo sheets which lie directly on one another; and establishing a bond connection between the organo sheets and the metallic reinforcing element by injecting a thermoplastic material into a mould gap kept free between a respective one of the organo sheets and a corresponding mould half, in order to partially melt the organo sheet in a surface region facing the mould gap, as well as flow through the organo sheets in a region of, and to fill the through-holes.

These features indicate a method which is simple to perform and with which a hybrid composite component may be produced which has a low weight and wherein the component connection may absorb relatively high forces.

Through the sandwich-like integration of the metallic reinforcing element between the organo sheets, the metallic reinforcing element is located in the neutral chamfer of the hybrid composite component. As is known from the cantilever principle, the highest stresses arise in the peripheral region of the component cross section. Peak stresses which arise may accordingly be better absorbed in the embodiment of the hybrid composite component according to the invention as a result of the relatively high strength organo sheets.

Further advantageous configurations and further developments of the method for producing a hybrid composite component from organo sheet structural components and a metallic connection element are revealed by the subclaims.

DRAWINGS

Embodiments will be illustrated by way of example in the drawings and explained in the description below.

FIG. 1 illustrates a composite component of organo sheets and a metallic reinforcing element in accordance with the prior art.

FIG. 2 illustrates a composite component of organo sheets and a metallic reinforcing element produced using the method in accordance with embodiments.

FIG. 3 illustrates a schematic sectional representation through an opened mould with inserted organo sheets, in accordance with embodiments.

FIG. 4 illustrates a schematic sectional representation through an opened mould with inserted metallic reinforcing element, in accordance with embodiments.

DESCRIPTION

Figure 6:
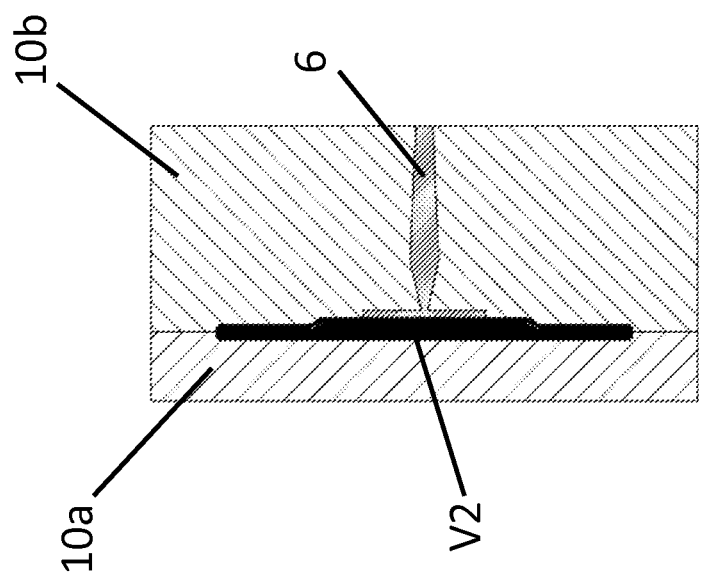
FIG. 6 illustrates a schematic sectional representation through a closed mould during injection of injection moulding material, in accordance with embodiments.

FIG. 2 illustrates a sectional representation of a composite component V2 produced using a method in accordance with embodiments from a pair of organo sheets 2a, 2b and a metallic reinforcing element 3. The metallic reinforcing element 3 is embedded in a manner of a sandwich between the organo sheets 2a, 2b. The metallic reinforcing element 3 comprises first and second end regions 4, into which through-holes 5 have been introduced. Furthermore, a through-hole 7 is introduced into the reinforcing element 3. The through-hole 7 enables a mechanical connection, such as, for example, a screw connection with a further component to be joined thereto.

A plurality of through-holes 8 are arranged in the organo sheets 2a, 2b in alignment with the through-hole 7. The described option of joining by way of a screw connection may also be achieved by alternative embodiments. For example, an eyelet or the like may be injection-moulded onto the metallic reinforcing element.

The metallic element 3 is held in place by the interlocking connection with the plastics material 6 introduced by injection into the through-holes 5 and the organo sheets 2a, 2b. On injection, the plastics material 6 is to flow through the second organo sheet 2b in a region of the through-holes 5 and fills them, to thereby meet the surface O of the first organo sheet 2a. A bonded connection then arises between the organo sheets 2a, 2b and the plastics material 6.

In accordance with embodiments, the method for producing a hybrid composite component V2 from organo sheets 2a, 2b and a metallic reinforcing element 3 is described in greater detail below with reference to FIGS. 3-6. Organo sheet here denotes a textile fabric enclosed in a thermoplastic. The fabric may, in particular, be a woven fabric, laid fabric or nonwoven fabric of natural, carbon, glass or mineral fibres. The organo sheets 2a, 2b are illustrated as plate-shaped elements for the sake of simplicity. However, they may also have other configurations/shapes. The production of such organo sheets is known and is not described in any greater detail.

As illustrated in FIGS. 3 and 4, the portion of the mould 10 of an injection moulding machine illustrated in accordance with embodiments includes an upper mould half 10a and a lower mould half 10b, which initially are arranged spaced from one another in an opened position of the mould 10. The lower mould half 10b is also designated below as the injection-side mould half, and comprises a first region B1 and a second region B2 having a recess. The transition between the first region B1 and the second region B2 is provided with a chamfer. The recess has a depth T, which corresponds approximately to the thickness of the metallic reinforcing element 3. The width B or the length L of the recess is embodied in accordance with the external dimensions of the metallic reinforcing element 3. A cavity 11 is located between the mould halves 10a, 10b when the mould halves 10a, 10b are in the closed position.

A plurality of bores 12 are introduced into the lower mould half 10b in the region B2, which bores 12 lead from a feed bore for the injection moulding material into the cavity 11. The feed bore 12 comprises valves for metering the injection moulding material/plastics material. The metering system is generally known and is therefore not described in any greater detail.

In a first production block, a pair of organo sheets having, such as, for example, a plate-shape, of corresponding shape and size are provided and inserted into the mould halves 10a, 10b and fixed in position therein. The organo sheets 2a, 2b are preheated and have approximately the melting point of the thermoplastic matrix material. The matrix material used may, for example, comprise a polyamide (PA 6.6). The melting point of this plastic amounts to 230 degrees Celsius.

As illustrated in FIG. 3, in this production block, the first organo sheet 2a rests on a corresponding surface region of the mould half 10a, and the second organo sheet 2b rests with its external peripheral regions 13 on a surface region of the region B1 of the mould half 10b. In the region B2 of the mould half 10b, the second organo sheet 2b is at the distance T from the surface region of the mould half 10b.

Then, in a next production block, a plate-shaped metallic reinforcing element 3 is provided and laid onto the surface region of the first organo sheet 2a facing the mould half 10a in the region B2. The metallic reinforcing element 3 comprises, as already described in relation to FIG. 2, a plurality of through-holes 5 and the through-hole 7. It is apparent from the illustration of FIG. 4 that after insertion of the metallic reinforcing element 3, the second organo sheet 2b adapts itself in shape to the contour of the mould half 10b in the second region B2, and the surface of the metallic reinforcing element 3 facing the mould half 10a is arranged flush with the adjacent surface regions, facing the mould half 10b, of the organo sheet 2b in the region B1. Due to the time taken to insert the organo sheets 2a, 2b and the metallic reinforcing element 3, it may become necessary to reheat the organo sheets 2a, 2b and the metallic reinforcing element 3. This may proceed automatically by a radiant heater 14 mounted on a robot.

Figure 5:
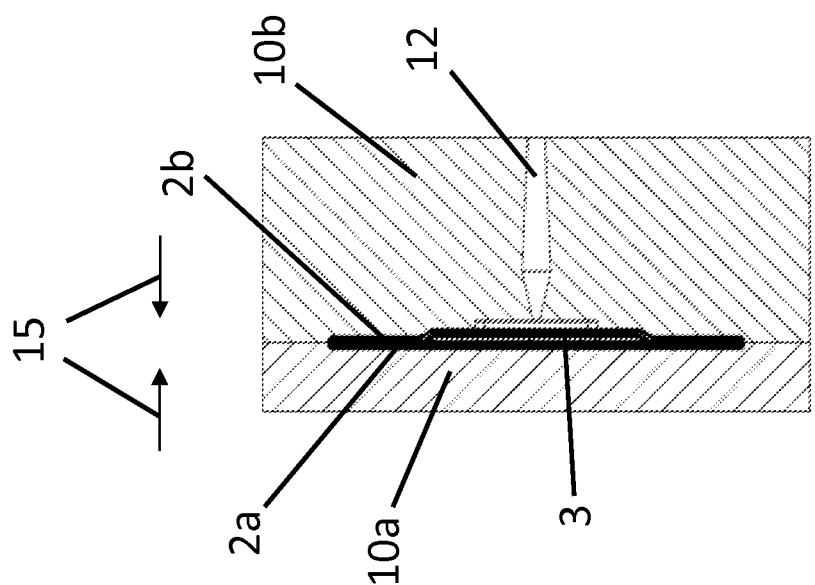
FIG. 5 illustrates a schematic sectional representation through a closed mould, in accordance with embodiments.

As illustrated in FIG. 5, after the above-stated heating, the mould halves 10a, 10b are closed 15 under pressure. In the process, a bonded connection of the organo sheets 2a, 2b is achieved at least in the region B1. In this region the organo sheets 2a, 2b lie with their mutually facing surface regions directly on one another.

As illustrated in FIG. 6, in a subsequent production block, an injection moulding material 6 is introduced via the feed bore 12 into a rear region of the second organo sheet 2b facing the lower mould half 10b into the mould gap, which has been kept free, of the cavity. In this production block, the injection moulding material 6 is distributed in the mould gap, which has been kept free, of the cavity 11 in the rear region of the organo sheet 2b and partially melts the rear surface region of the organo sheet 2b. Due to the above-stated melting, the injection moulding material 6 may flow through the organo sheet 2b in the region of the through-holes 5 and the plurality of through-holes 5 in the metallic reinforcing element 3 are filled.

The injected injection moulding material 6 or the regions onto which the material 6 has been injected and through which it has flowed are apparent in the sectional illustration of FIG. 2. From this illustration it is also clear that the regions 16 between the chamfer of the organo sheet structural component 2b and lateral peripheral regions of the metallic reinforcing element have been back-injected. Filling of these regions prevents a notch effect.

After the injection moulding production block, the hybrid composite component may be removed from the mould. It is apparent from the sectional illustration of FIG. 2 that the metallic reinforcing element 3 is arranged embedded between the plate-shaped organo sheet structural components 2a, 2b and an additional interlocking connection is imparted by the injection moulding material 6 in the region of the through-holes 5.

As materials for the organo sheets 2a, 2b, polypropylenes or polyamides may be used as the matrix material. The metallic reinforcing element may comprise a sheet steel. The injection moulding material 6 may comprise a thermoplastic, which is similar in type to the matrix material of the organo sheet with regard to its chemical characteristics. An example of such a pairing might be an organo sheet of polypropylene with glass fibre woven fabric and a polyethylene GF30 injection moulding material.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

What is claimed is:

1. A method for producing a hybrid composite component, the method comprising:
   providing a first organo sheet, a second organo sheet, and a metallic reinforcing element having a plurality of through-holes;
   inserting the first organo sheet into a first mould half of a mould, and inserting the second organo sheet into a second mould half of the mould, wherein the second mould half is an injection-side mould half including a first region and a second region having a recess with a depth, a width, and a length corresponding to the external dimensions of the metallic reinforcing element;
   laying the metallic reinforcing element on the first organo sheet;
   closing the mould with application of a pressure, in order to achieve a bonded connection of regions of the organo sheets which lie directly on one another;
   establishing a bond connection between the organo sheets and the metallic reinforcing element by injecting a thermoplastic material into a mould gap kept free between a respective one of the organo sheets and a corresponding mould half, in order to partially melt the organo sheet in a surface region facing the mould gap, as well as flow through the organo sheets in a region of, and to fill the through-holes; and
   opening the mould and removing the hybrid composite component.

2. The method of claim 1, further comprising, after laying the metallic reinforcing element, and before closing the mould, heating the organo sheets and the metallic reinforcing element.

3. The method of claim 1, wherein the organo sheets comprise a textile fabric enclosed in a thermoplastic.

4. The method of claim 3, wherein:
   the thermoplastic comprises polypropylene; and
   the textile fabric comprises one of a woven fabric, a laid fabric, a non-woven fabric of one of natural, carbon, glass, or mineral fibres.

5. The method of claim 3, wherein:
   the thermoplastic comprises polyamide; and
   the textile fabric comprises one of a woven fabric, a laid fabric, a non-woven fabric of one of natural, carbon, glass, or mineral fibres.

6. The method of claim 3, wherein the injection moulding material comprises a polyethylene GF30, and the organo sheets comprise polypropylene with glass fibre woven fabric.

7. The method of claim 1, further comprising, arranging a chamfer between the first regions and the second region.

8. The method of claim 7, wherein in establishing the bond connection, the injection moulding material is injected between the chamfer of the organo sheet structural component and lateral peripheral regions of the metallic reinforcing element.

9. A method for producing a hybrid composite component, the method comprising:
   providing a first organo sheet, a second organo sheet, and a metallic reinforcing element having a plurality of through-holes;
   inserting the first organo sheet into a first mould half of a mould, and inserting the second organo sheet into a second mould half of the mould, wherein the second mould half is an injection-side mould half including a first region and a second region having a recess with a depth, a width, and a length corresponding to the external dimensions of the metallic reinforcing element;
   laying the metallic reinforcing element on the first organo sheet;
   closing the mould with application of a pressure, in order to achieve a bonded connection of regions of the organo sheets which lie directly on one another; and
   establishing a bond connection between the organo sheets and the metallic reinforcing element by injecting a thermoplastic material into a mould gap kept free between a respective one of the organo sheets and a corresponding mould half, in order to partially melt the organo sheet in a surface region facing the mould gap, as well as flow through the organo sheets in a region of, and to fill the through-holes.

10. The method of claim 9, further comprising, after laying the metallic reinforcing element, and before closing the mould, heating the organo sheets and the metallic reinforcing element.

11. The method of claim 9, wherein the organo sheets comprise a textile fabric enclosed in a thermoplastic.

12. The method of claim 11, wherein:
   the thermoplastic comprises polypropylene; and
   the textile fabric comprises one of a woven fabric, a laid fabric, a non-woven fabric of one of natural, carbon, glass, or mineral fibres.

13. The method of claim 11, wherein:
   the thermoplastic comprises polyamide; and
   the textile fabric comprises one of a woven fabric, a laid fabric, a non-woven fabric of one of natural, carbon, glass, or mineral fibres.

14. The method of claim 11, wherein the injection moulding material comprises a polyethylene GF30, and the organo sheets comprise polypropylene with glass fibre woven fabric.

15. The method of claim 9, further comprising, arranging a chamfer between the first regions and the second region.

16. The method of claim 15, wherein in establishing the bond connection, the injection moulding material is injected between the chamfer of the organo sheet structural component and lateral peripheral regions of the metallic reinforcing element.

* * * * *